Oct. 14, 1958     E. M. FRANKLAND     2,856,012
MECHANICAL PITCH LOCK
Filed May 28, 1954
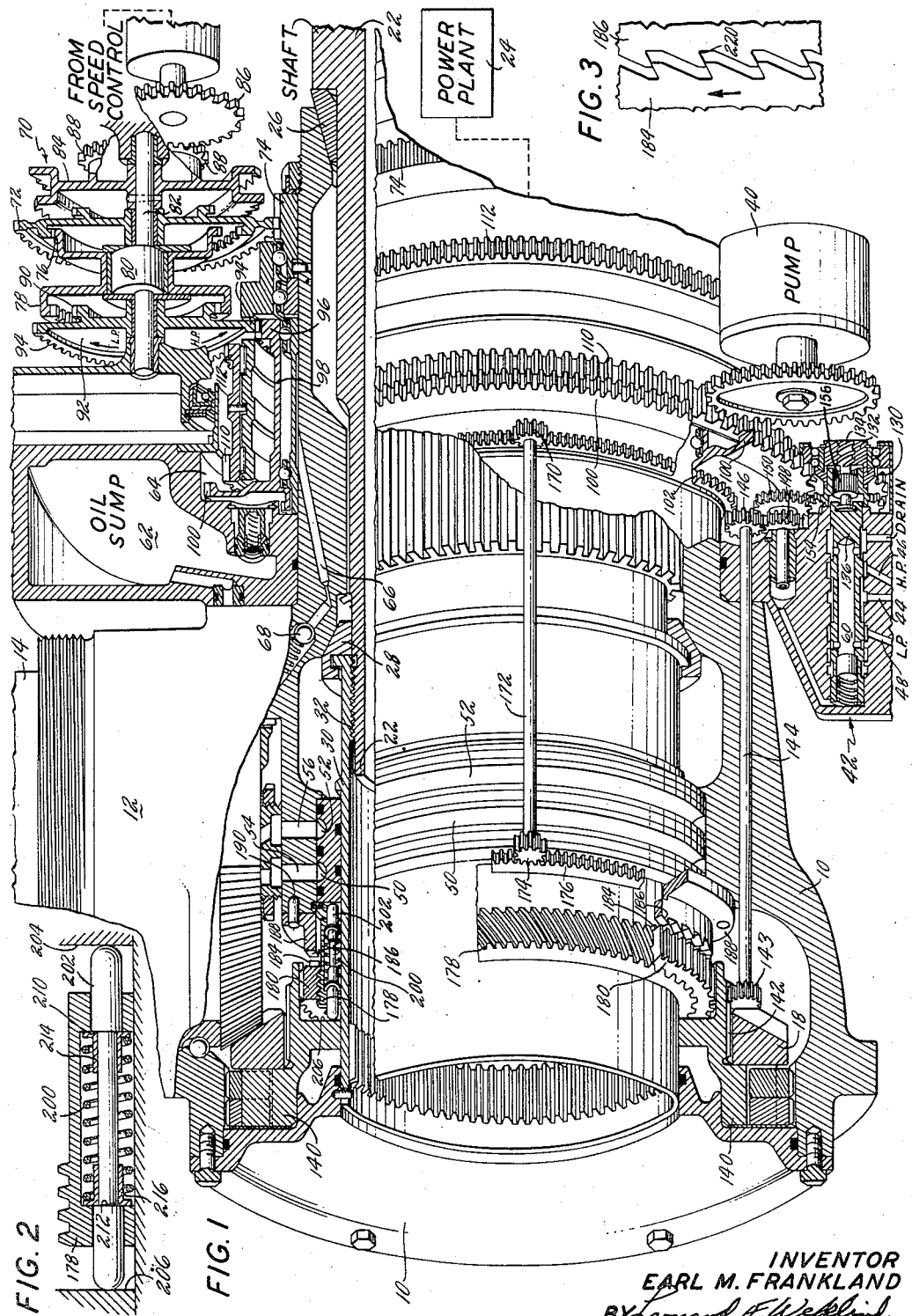
INVENTOR
EARL M. FRANKLAND
ATTORNEY

United States Patent Office 2,856,012
Patented Oct. 14, 1958

2,856,012

MECHANICAL PITCH LOCK

Earl M. Frankland, Little Compton, R. I., assignor to United Aircraft Corporation, East Hartford, Conn., a corporation of Delaware Application May 28, 1954, Serial No. 432,981

14 Claims. (Cl. 170—160.32)

This invention relates to variable pitch propellers and more particularly to pitch locks therefor.

It is an object of this invention to provide a simple but positive pitch lock for variable pitch propellers.

It is a further object of this invention to provide a mechanical pitch lock which will prevent the blades from moving toward low pitch when certain undesirable operating conditions occur.

These and other objects of this invention will become readily apparent from the following detail description of the drawing in which:

Fig. 1 is a partial schematic cross-sectional perspective view of a propeller including the pitch lock mechanism of this invention.

Fig. 2 is a detail cross-sectional view of the centering mechanism for one of the pitch lock elements; and Fig. 3 is a detail partial cross section of the tooth profile for the pitch lock elements.

In order to permit continued operation of a variable pitch propeller in the event that there is some failure of power or other malfunction effecting blade pitch control, it is desirable to automatically lock the blades so as to prevent the blades from moving toward zero or flat pitch. Therefore, should the blades start to move toward a flat pitch when the propeller pitch control system is not signalling for such a pitch change, it is desirable in some manner to lock the blades against such decrease pitch movement. Also, should the blades not respond to a control signal calling for an increased pitch, it is desirable to lock the blades against movement toward decreased pitch position to prevent any inadvertent pitch reduction. It is then the purpose of this invention to provide the foregoing operative features.

Referring to Fig. 1, a hub 10 is shown as having at least one blade socket 12 in which is mounted a variable pitch blade 14 having an integral segmental gear 16. As is usual the segmental gear 16 is connected to a gear 18 which coordinates the movement of all of the blades. The propeller including the hub 10 is mounted on a shaft 22 which is driven by any suitable power plant 24. The propeller hub is positioned on the shaft 22 by a rear cone 26 and a front cone 28 with the front cone 28 being engaged by an elongated nut 30. The nut 30 is tightened up onto the shaft 22 by means of threads 32.

Each of the propeller blades such as the blade 14 has suitable hydraulically operated pitch changing motors mounted in the base thereof to impart rotary motion to the blade about its longitudinal axis. The blade motor may be of the type shown in Patent 2,623,601, or any other suitable motor may be used. The flow of fluid from a suitable pump 40 is controlled by a suitable pilot valve generally indicated at 42. High pressure fluid is fed from the pump 40 by suitable passages (not shown) to the high pressure passage 44 leading to the pilot valve 42. The high pressure fluid can then be fed to a high pitch line 46 or a low pitch line 48 which communicate with annular passages 50 and 52 which in turn, lead to passages 54 and 56 to either side of the hydraulic pitch changing motor. As is usual, when one side of the pitch changing motor is connected to high pressure fluid the other side will be connected to drain through the center channel 60 of the pilot valve 42 and then out to the drain channel so marked.

The hub 10 of the propeller also includes a pressurized oil sump 62 from which fluid is conducted by suitable means to the pump 40. A low pressure or atmospheric sump 64 is also provided and this sump surrounds a number of gear elements and contains oil for lubricating these various parts. Also a passage 66 leads from the sump 64 through a ball check 68 and then to the base of the propeller blade to provide lubricating oil therefor. The ball check 68 normally will be open during propeller rotation due to centrifugal force therefore permitting the free flow of lubricating oil. When the propeller is not rotating the ball check 68 prevents lubricating oil from draining from the upper blades.

The valve 42 which controls the flow of fluid to the blade pitch changing motors is controlled through a gear train generally indicated at 70. The gear train 70 includes a gear 72 meshing with a gear 74 carried by the propeller hub. The gear 72 also contains internal gear teeth which mesh with a gear 76. The gear 76 has fewer teeth than the internal teeth on the gear 72. The gear 76 is integral with another ring gear 78 and both are mounted on an eccentric 80. The eccentric 80 is fixed to shaft 82 which in turn is pinned to gear 84 which meshes with gear 86 by means of the teeth 88. The gear 78 meshes with an externally toothed portion 90 on gear wheel 92. The wheel 92 further includes another gear 94 which meshes with a gear 96 which has a forwardly extending sleeve-like portion 98 integral therewith for carrying another gear 100. The gear 100 is in L shape and carries a second gear portion 102 of smaller diameter.

Returning to the gear train 70, the purpose thereof is to, under suitable conditions, provide equal speeds for both gears 96 and 74 during propeller rotation. Under equilibrium conditions both gears will be rotating at propeller speed. It thus is possible by means of the eccentric 80 and the shaft 82 to have the gears 94, 96, 100 and 102 to advance or retard in speed in relation to the gear 74 which is rotating at propeller speed. Thus by rotating the eccentric 80 and the shaft 82 via the gears 88 and 86 the axis of the gears 76 and 78 can be changed in relation to their adjacent gear wheels 72 and 92. This advanced or retarded speed is then transmitted as a pitch changing motion to the control valve 42 in a manner to be described hereinafter. The purpose of the gear train 70 is to provide a suitable ratio of motion from the input to the output of the train.

The essential pitch changing motion going to the beginning of the gear train 70 may come from any suitable signalling means as for example the servo type disclosed in Patent No. 2,666,490, issued to Nelson R. Richmond on January 19, 1954. In addition, the particular gear train illustrated in that patent may as well be substituted for the gear train 70 shown herein. The signal or rotary motion will come from any desirable speed control so as to initiate motion of the gear train 70 to obtain a pitch change. Such motion may also be derived from a control such as that illustrated and disclosed in patent application Serial No. 426,061 for Servo Control System for a Variable Pitch Propeller, filed April 28, 1954, by Stanley G. Best.

Located between gears 96 and 100 is a pair of integral gears 110 and 112 which are suitably mounted around the connecting sleeve 98 and are normally held stationary by means of suitable connections to a unit which is normally stationary during propeller rotation. Such a gear connection is illustrated in the above-mentioned Richmond patent. The pump 40 is connected to the gear 110 and since the pump is carried by the propeller hub it will be driven during rotation of the propeller. As shown in the Richmond patent mentioned, the gear 110 can be connected to suitable means for rotating the gear when the propeller is stationary to cause rotation and operation of the pump 40.

Returning to the final output of the above-described gear train, the gear combination 100, 102 engages the propeller pitch change and lock mechanism as follows: The larger gear portion 100 engages a gear 130 which is integral with a nut 132 having internal threads engaging the threaded portion 134 on the movable member 136 of the pilot valve 42. Rotation of the gear 130 by the gear 100 will through the above-described connection, cause the movable member 136 of the pilot valve 42 to be reciprocated so as to connect either side of the blade pitch changing motors with high pressure or drain so as to urge the blades toward an increase or decrease pitch position. As the blades change pitch the blade coordinating gear 18 will rotate along with the annular member 140 and the spline 142. The spline 142 in addition to forming a connection between the coordinating gear 18 and the member 140 also engages a follow up gear 143. The gear 143 is connected by a shaft 144 to a gear train comprising gears 146, 148 and 150. The gear 150 is connected to a sleeve 154 which can rotate the gear 156 so as to return movable element 136 of the pilot valve 42 to a neutral position. The operation of this type of valve mechanism is well known and hence is not described in detail.

Should the blades fail to respond to a pitch change as called for by motion of the movable element 136, which motion we can consider as originating at the gear 100, it is desirable to lock the blades against decreased pitch movement since such lack of response of the blades is indicative of some malfunction of the pitch changing system. To this end the smaller gear 102 of the gear combination 100, 102 connects to a gear 170, a shaft 172 and a companion gear 174. The gear 174 is connected to an annular gear segment 176 integral with gear 178 which has helical teeth. Thus rotary motion of the gear 102 is transmitted to the gear 178. Cooperating helical teeth are provided internally of an annular gear 180 which also includes external teeth engaging cooperating teeth on the annular member 140 which, as previously described above, rotates during pitch change. The annular gear 180 includes on its aft face ratchet type teeth 184 which are intended to engage cooperating ratchet teeth 186 carried by the member 188 which is fixed to the propeller hub by means of pins 190. The cooperating ratchet teeth 184 and 186 constitute the engageable elements which, when engaged, will prevent the blades from moving toward low pitch. Thus the teeth are so shaped that when engaged the blades may ratchet toward a higher pitch but motion toward a lower pitch is prevented.

The pitch lock elements are intended to operate as follows: When an increased pitch change is called for the gear 100 will actuate the pitch changing pilot valve while at the same time the gear 102 through the train 170, 172, 174, 176 will rotate gear 178. Due to the helical gear connection between gear 178 and gear 180, assuming that gear 180 is not rotating at the moment, the latter will tend to be moved axially toward the fixed pitch lock element 188 thus tending to engage the teeth 184, 186. However, in the event that the blades respond immediately to the increased pitch changing signal the annular gear 180 will also be rotated so as to in fact equalize or neutralize the motion of the helical gear 178. Thus, if the blades respond to the increased pitch change signal the teeth 184 and 186 will not engage. However, it is apparent that should be blades not respond to the increased pitch change so that the annular gear 180 will not rotate, it will be moved axially so that the ratchet teeth 184 and 186 will engage. The ratchet teeth 184 and 186 are more clearly shown in Fig. 3.

The helical gear 178 is centered by a spring 200 and pin 202. The pin 202 engages fixed hub walls 204 and 206 at its opposite ends. This centering device is shown in better detail in Fig. 2. The pin 202 is a single rigid piece and includes a pair of opposing shoulders 210 and 212. Split sleeves 214 and 216 engage the shoulders 210 and 212 respectively. The spring 200 holds each sleeve in engagement with its respective shoulder on shaft pin 202 and depending upon the direction of axial motion of the gear 178 it will also keep the sleeve in engagement with the adjacent surface portion of the gear 178. Thus it is apparent that the gear 178 will be urged toward a centered position axially thereof toward a position as that shown in Fig. 2. However, this arrangement permits gear 178 to have some freedom of motion back and forth along its axis of rotation.

This centering device has two functions. First of all, as shown in Fig. 3, the ratchet teeth 184 and 186 have undercut portions 220 so that when the gear 184 is, for example, moving in the direction of the arrow as soon as the piece began to engage there is a component tending to move the teeth into full engagement. The reason for this type of construction is to insure that the load is taken by the full depth of the teeth and not merely the ends thereof. Hence, with this type of force urging the teeth into full engagement it is necessary to permit the gear 178 and the gear 180 to move axially through this distance which is approximately equal to the tooth depth. The teeth 184, 186 it will be apparent will be able to ratchet out of engagement should the relative motion be just the opposite of that shown in Fig. 3, i. e., when the blades suddenly want to move toward high pitch while in a locked position. Here again during ratcheting it is necessary that the gear 178 and the gear 180 be able to move axially even though there may be no relative rotary movement therebetween. It might be added that the pitch changing mechanism and the pitch lock mechanism are so adjusted so that there is approximately 3° of blade movement permissible before the pitch lock is intended to engage. This is to provide for slight tolerances in manufacture so that constant engagement and disengagement may be avoided. This fine adjustment of pitch change relative to pitch lock change is aided by the above-referred to application of Stanley G. Best.

It should be added that in the event the blades begin to move toward low pitch when no pitch change signal is called for the lock would engage. Thus the gear 178 would normally be stationary when no pitch change is called for hence as soon as gear 180 is rotated as a result of pitch change the lock would engage.

In view of the foregoing it is apparent that an accurate and reliable mechanical pitch lock mechanism has been provided for positively and mechanically locking up the blades when there is a malfunction in the propeller pitch change system.

Although only one embodiment of this invention has been illustrated and described herein it will be apparent that various changes and modifications may be made in the arrangement and construction of the various parts without departing from the scope of this novel concept.

What it is desired to obtain by Letters Patent is:

1. In a propeller having a hub and blades mounted for pitch changing movement relative to said hub, hydraulic means for varying the pitch of said blades including a movable control element for controlling the pitch position, an element fixed relative to said hub, and means mechanically and continuously connecting said blades with said movable control element including an element movable into engagement with said fixed element for locking said blades against movement when a predetermined relationship exists between said blades and movable control element.

2. In a propeller having a hub and blades mounted for pitch changing movement relative to said hub, hydraulic means for varying the pitch of said blades including a movable control element, an element fixed relative to said hub, and means mechanically connecting said blades with said movable control element including an element movable into locking engagement with said fixed element to mechanically lock said blades against movement when a predetermined relationship exists between said blades and movable control element.

3. In a propeller having a hub and blades mounted for pitch changing movement relative to said hub, hydraulic means for varying the pitch of said blades including a movable control element, an element fixed relative to said hub, and means mechanically connecting said blades with said movable control element including an element movable into locking engagement with said fixed element for locking said blades against movement when a predetermined relationship exists between said blades and movable control element, said movable element including a toothed connection to said movable control element.

4. In a propeller having a hub and blades mounted for pitch changing movement relative to said hub, means for verying the pitch of said blades, a source of power, control means operatively connected to said source and said pitch changing means and movable in pitch increase and decrease directions, a pitch lock element fixed to said hub, first means movable with said blades during pitch change, second means movable with said control means, and means operatively connecting said first and second means including an element movable into engagement with said fixed element to mechanically lock said blades against movement when a predetermined relationship exists between said first and second means.

5. In a propeller having a hub and blades mounted for pitch changing movement relative to said hub, means for varying the pitch of said blades, a source of power, control means operatively connected to said source and said pitch changing means and movable in pitch increase and pitch decrease directions, a mechanical pitch lock for locking said blades against movement relative to said hub including a lock element fixed to said hub and cooperating mechanism having a portion movable with respect to said hub for engagement with said fixed lock element, means connecting said cooperating mechanism with said blades and with said control means to move said movable portion into engagement with said fixed lock element during substantially uncoordinated movement of said blades relative to said control means.

6. In a propeller having a hub and blades mounted for pitch changing movement relative to said hub, means for varying the pitch of said blades, a source of power, control means operatively connected to said source and said pitch changing means and movable in pitch increase and pitch decrease directions, a mechanical pitch lock for locking said blades against movement relative to said hub including a lock element fixed to said hub, means for generating a directional signal responsive to movement of said control means, means for generating a directional signal responsive to movement of said blades, a receiver for said signals, and means operatively connected to said receiver and movable into engagement with said fixed element for locking said blades against movement relative to said hub when said signals have a predetermined relationship.

7. In a propeller having a hub and blades mounted for pitch changing movement relative to said hub, hydraulic means for varying the pitch of said blades including a movable control element, an element fixed relative to said hub, first means movable with said blades during pitch change including a movable element engageable with said fixed element, second means movable with said movable control element, and a toothed connection between said first and second means whereby said movable element moves into engagement with said fixed element to lock said blades against movement in response to a predetermined relationship between said first and second means.

8. In a propeller having a hub and blades mounted for pitch changing movement relative to said hub, hydraulic means for varying the pitch of said blades including a movable control element, an element fixed to said hub, means mechanically connecting said blades with said movable control element including a second element mechanically connected to the blades and movable into locking engagement with said fixed element when a predetermined relationship exists between said blades and movable control element, and spiral teeth connecting said second movable element and said movable control element.

9. In a propeller having a hub and blades mounted for pitch changing movement relative to said hub, means for varying the pitch of said blades, a source of power, control means operatively connected to said source and said pitch changing means and movable in pitch increase and decrease directions, a pitch lock element fixed to said hub, a first gear means movable with said blades during pitch change, a second gear means movable with said control means, and means interconnecting said first and second gear means including an element movable into engagement with said fixed element in response to said both gear means achieving a predetermined relationship to thereby positively lock said blades against pitch change.

10. A pitch locking mechanism for a variable pitch propeller, the propeller including a hub having variable pitch blades carried thereby, means for varying the pitch of said blades including a movable control member, means for mechanically locking said blades with respect to said hub including a movable element having a geared connection to said blades, a locking element fixed to said hub, means movable with said movable control member and mechanically connected to said movable element, said locking elements being movable into locking engagement upon substantially nonsynchronous movement of said blades and said movable control member.

11. In a propeller having a hub and blades mounted for pitch changing movement relative to said hub, means for varying the pitch of said blades, a source of power, control means operatively connected to said source and said pitch changing means and movable in pitch increase and decrease directions, a pitch lock element fixed to said hub, a first gear means movable with said blades during pitch change, a second gear means movable with said control means, and means mechanically interconnecting said first and second gear means including an element movable with respect to said fixed element, said movable element being engageable with said fixed element in response to said both gear means achieving a predetermined relationship to thereby positively lock said blades against pitch change, said interconnecting means including spiral toothed connections between said last mentioned element and said second gear means.

12. In a propeller having a hub and blades mounted for pitch changing movement relative to said hub, means for varying the pitch of said blades including a source of power, control means operatively connected to said source and said pitch changing means and movable in pitch increase and decrease directions, a pitch lock element fixed to said hub, a first gear means movable with said blades during pitch change, a second gear means movable with said control means, and spiral gear means interconnecting said first and second gear means including an element movable along the axis of rotation of said gear means and engageable with said fixed element upon achieving a predetermined relationship between said first and second gear means.

13. In a propeller according to claim 12 wherein said spiral gear means includes a pair of cooperating helical gears.

14. A pitch lock mechanism for a variable pitch propeller including a hub having variable pitch blades carried thereby, means for varying the pitch of said blades including a movable control member, means fixed relative to said hub, first movable means having a mechanical connection to said blades, second means movable with said control member and connecting means between said first and second means and responsive to tangential and axial force components between said first and second means for connecting said connecting means to said means fixed relative to said hub.

References Cited in the file of this patent

UNITED STATES PATENTS

| | | |
|---|---|---|
| 2,592,124 | Diefenderfer | Apr. 8, 1952 |
| 2,635,702 | Anderson | Apr. 21, 1953 |